US007940419B2

(12) United States Patent
Tatsumi et al.

(10) Patent No.: US 7,940,419 B2
(45) Date of Patent: May 10, 2011

(54) IMAGE FORMING METHOD AND APPARATUS FOR EFFECTIVELY POSITIONING AN IMAGE FORMING MEMBER

(75) Inventors: Kenzo Tatsumi, Osaka (JP); Yoshiyuki Shimizu, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 1323 days.

(21) Appl. No.: 11/441,252

(22) Filed: May 26, 2006

(65) Prior Publication Data

US 2006/0268373 A1 Nov. 30, 2006

(30) Foreign Application Priority Data

May 30, 2005 (JP) ................................ 2005-157027

(51) Int. Cl.
*G06F 15/00* (2006.01)
*H04N 1/04* (2006.01)

(52) U.S. Cl. ........................................ 358/1.4; 358/474

(58) Field of Classification Search .................. 358/1.1, 358/1.4, 1.8, 1.11, 1.13, 1.14, 474; 399/27, 399/100
See application file for complete search history.

(56) References Cited

U.S. PATENT DOCUMENTS

| | | | | |
|---|---|---|---|---|
| 5,201,854 | A * | 4/1993 | Ahl et al. | 439/247 |
| 5,612,771 | A * | 3/1997 | Yamamoto et al. | 399/301 |
| 7,181,152 | B2 * | 2/2007 | Kuma et al. | 399/110 |

FOREIGN PATENT DOCUMENTS

| | | |
|---|---|---|
| JP | 10-177286 | 6/1998 |
| JP | 11-295952 | 10/1999 |
| JP | 2001-100488 | 4/2001 |
| JP | 2002-278228 | 9/2002 |
| JP | 2003-107784 | 4/2003 |
| JP | 2003-295625 | 10/2003 |
| JP | 2004-70194 | 3/2004 |
| JP | 2004-151274 | 5/2004 |
| JP | 2004-233627 | 8/2004 |
| JP | 2004-240198 | 8/2004 |

OTHER PUBLICATIONS

Communication issued by the Japanese Patent Office for Japanese Patent Application No. 2005-157027.

* cited by examiner

*Primary Examiner* — Gabriel I Garcia
(74) *Attorney, Agent, or Firm* — Harness, Dickey & Pierce, P.L.C.

(57) ABSTRACT

An image forming apparatus includes a transfer member configured to receive an image, and a first image forming unit including a first image bearing member and a first pair of developing units having developers of colors different from each other, and a second image forming unit including a second image bearing member and a second pair of developing units having developers of colors different from each other and from the first pair of developing units, each of the first and second image forming units configured to slidably move in a direction parallel to a horizontal plane of the image forming apparatus in a manner facing a surface of the transfer member and to be biased toward a desired position with respect to the transfer member when a cover of the image forming apparatus is moved to its closed position.

8 Claims, 7 Drawing Sheets

IMAGE FORMING METHOD AND APPARATUS FOR EFFECTIVELY POSITIONING AN IMAGE FORMING MEMBER

PRIORITY STATEMENT

The present patent application claims priority under 35 U.S.C. §119 upon Japanese patent application no. 2005-157027, filed in the Japan Patent Office on May 30, 2005, the disclosure of which is incorporated by reference herein in its entirety.

BACKGROUND

1. Field of Invention

The present invention relates to an image forming apparatus for effectively positioning an image forming member and a method of positioning the image forming member used in the image forming apparatus.

2. Description of the Background Art

Image forming apparatuses, such as copiers, printers, facsimile machines, and so forth, form an electrostatic latent image on an image bearing member. The electrostatic latent image is developed by a developing unit to a toner image to be transferred onto a recording medium. After the toner image is fixed by a fixing unit, the fixed image is finally output to a sheet discharging tray.

Some background image forming apparatuses use one image bearing member for producing a single color image, and some use a plurality of image bearing members for producing a multiple color image including a full-color image.

The above-described background image forming apparatuses for full-color images employ methods as described below. One of the methods is that a plurality of image bearing members forms respective single color toner image, and sequentially overlays the respective single color toner images of different colors onto a recording medium conveyed by a sheet feeding unit and/or a sheet transfer member. Another method is that a plurality of image bearing members forms respective single color toner images that are sequentially transferred onto a surface of an intermediate transfer member so that an overlaid color toner image is formed on the surface of the intermediate transfer member to further be transferred onto a recording medium. Further, another method is that one image bearing member forms respective single color toner images by turns and sequentially transfers these single color toner images directly onto a recording medium conveyed by an intermediate sheet transfer member.

A structure of an image forming apparatus having a plurality of image bearing members arranged in a line parallel to a sheet feeding direction of a belt-shape intermediate transfer member is well known as a tandem type structure.

An image forming apparatus employing the tandem type structure is generally required to have a plurality of image forming units, and therefore, the image forming apparatus is likely to become large in size and complicated in system structure.

To eliminate the problem, some techniques have been proposed. One of the techniques has proposed to have an image forming apparatus including a first image bearing member surrounded by two developing units having different colors of developers from each other and a second image bearing member surrounded by two other developing units having different colors of developers from each other and from the developing units disposed around the first image bearing member. Respective color toner images formed on the first and second image bearing members are transferred on an intermediate transfer belt.

With the above-described structure, the number of image bearing members disposed in an image forming apparatus can be reduced, for example from four to two, and therefore, the size in the image forming apparatus and the complexity in the system structure can be reduced or eliminated.

The above-described structure has two housing units, each of which can include respective image forming units. More specifically, one of the two housing units includes the first image bearing member and the two developing units disposed around the first image bearing member, and the other of the two housing unit includes the second image bearing member and the two developing units disposed around the second image bearing member. These housing units are arranged to have a minimum amount of space between them, and each of the housing units can detachably be attached to the image forming apparatus in a same direction to which a surface of an intermediate transfer belt is extended.

In the above-described structure, the developing units are fixedly disposed in the respective housing units. Therefore, when the housing units are attached to and detached from the image forming apparatus, an operator needs to separate the intermediate transfer belt from the housing units so as to obtain sufficient space for replacing the housing units without damaging the intermediate transfer belt. Therefore, a sufficient amount of space for replacing the housing units is required, and especially a space for separating the intermediate transfer belt from the housing units is required. For the above-described reasons, the size of the image forming apparatus may need to be increased. More specifically, the above-described technique involves a structure in which the housing units are moved in the same direction as extends the surface of the intermediate transfer member, making it necessary to have a sufficient space to avoid the housing units from contacting or damaging the surface of the intermediate transfer member when the housing units are replaced. However, the greater the space becomes, the larger the size of the image forming apparatus increases.

Further, the image bearing member and the developing units are precisely positioned relative to each other in the housing unit. However, when errors occur in a processing step and/or a positioning step, it may be difficult to obtain such precise positioning.

SUMMARY OF THE INVENTION

One of more embodiments of the present invention has been made in view of the above-mentioned circumstances.

At least one embodiment of the present invention provides an image forming apparatus that can perform an accurate positioning of image forming units by moving a cover of the image forming apparatus to its closed position so that the image forming units can be biased toward desired positions by the movement of the cover to its closed position, which can result in no increase of costs and no damage to image forming components during a replacement thereof.

At least one embodiment of the present inventions provides a method of positioning the image forming units with respect to a transfer member provided in the image forming apparatus.

An embodiment of the present invention provides an image forming apparatus that includes a transfer member configured to receive an image, and at least one image forming unit configured to slidably move in a direction parallel to a horizontal plane of the image forming apparatus in a manner facing a surface of the transfer member and to be biased toward a desired position with respect to the transfer member when a cover of the image forming apparatus is moved to its closed position.

An embodiment of the present invention provides method of positioning an image forming unit with respect to a transfer member includes opening a cover of the image forming apparatus, slidably inserting an image forming unit with an image bearing member mounted therein with into an image forming apparatus, moving the image forming unit in a direction parallel to a horizontal plane of the image forming apparatus in a manner facing a surface of the transfer member toward a given position in which an image bearing member is held in contact with the transfer member, engaging a developing unit with a sliding guide mounted on an inner surface of the image forming unit, pushing back the developing unit in a direction parallel to a horizontal plane of the image forming apparatus toward the image bearing member in a manner facing the surface of the transfer member until the developing unit contacts an end plate of the sliding, and closing the cover of the image forming apparatus.

Additional features and advantages of the present invention will be more fully apparent from the following detailed description of example embodiments, the accompanying drawings and the associated claims.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EXAMPLE EMBODIMENTS

Figure 1:
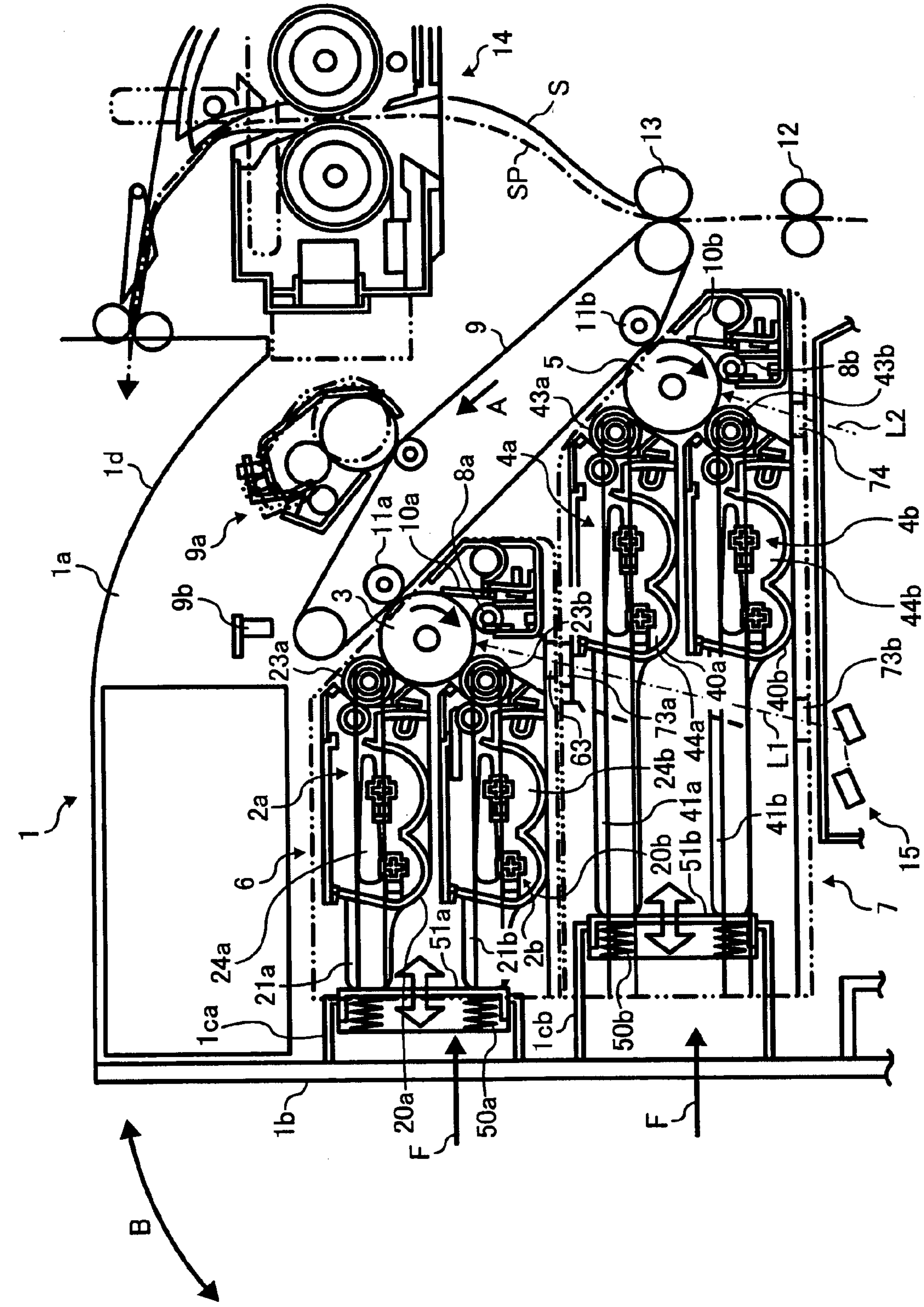
FIG. 1 is a schematic structure of an image forming apparatus according to an example embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1 of the drawings, an image forming apparatus 1 according to at least one example embodiment of the present invention is described.

FIG. 1 shows a main body 1*a* of the image forming apparatus 1. The main body 1*a* of the image forming apparatus 1 includes two pairs of developing units 2*a* and 2*b*, and 4*a* and 4*b*, two photoconductive drums 3 and 5, charging units 8*a* and 8*b*, an intermediate transfer belt 9, drum cleaning units 10*a* and 10*b*, and an optical writing unit 15.

The developing units 2*a* and 2*b* both include respective developers or toners of colors different from each other, and respectively supply the developers to the photoconductive drum 3 to develop respective color toner images. The developing units 2*a* and 2*b* are disposed around the photoconductive drum 3 serving as an image bearing member that is used to bear an electrostatic latent image on its surface.

The developing units 4*a* and 4*b* also include respective developers or toners of colors different from each other and also different from the colors of respective developers accommodated in the developing units 2*a* and 2*b*, and respectively supply the developers to the photoconductive drum 5 to develop respective color toner images. The developing unit 4*a* and 4*b* are disposed around the photoconductive drum 5 serving as an image bearing member that is used to bear an electrostatic latent image on its surface.

The developing units 2*a*, 2*b*, 4*a*, and 4*b* include developer containers 20*a*, 20*b*, 40*a*, and 40*b*, respectively, and handles 21*a*, 21*b*, 41*a*, and 41*b*, respectively.

The photoconductive drums 3 and 5 have similar structures and functions, except colors of respective toner images supplied by the developing units 2*a*, 2*b*, 4*a*, and 4*b*, respectively. The developing units 2*a* and 2*b* for the photoconductive drum 3 and the developing units 4*a* and 4*b* for the photoconductive drums 5 have similar structures and functions, except the colors of respective developers or toners to be supplied to the photoconductive drums 3 and 5, respectively, and except for the lengths of the handles 21*a*, 21*b*, 41*a*, and 41*b*. The lengths of the handles 21*a* and 21*b* are shorter than the lengths of the handles 41*a* and 41*b* because of the structure of the main body 1*a* of the image forming apparatus 1.

The photoconductive drum 3 and the two developing units 2*a* and 2*b* having different colors of developers or toners are integrally mounted in a first image forming unit 6. The photoconductive drum 5 and the two developing units 4*a* and 4*b* having different colors of developers or toners are integrally mounted in a second image forming unit 7.

The first and second image forming units 6 and 7 have a housing structure similar to each other, except the lengths thereof because of the structure of the main body 1*a* of the image forming apparatus 1. The photoconductive drums 3 and 5 have respective rotating shafts (not shown). Both ends of the rotating shaft of the photoconductive drum 3 are engaged with unit side plates 61 (see FIG. 3) of the image forming unit 6 so that the photoconductive drum 3 can be supported in a longitudinal direction of the first image forming unit 6. Similarly, both ends of the rotating shaft of the photoconductive drum 5 are engaged with unit side plates 71 (see FIG. 3) of the image forming unit 7 so that the photoconductive drum 5 can be supported in a longitudinal direction of the second image forming unit 7. With the above-described structure, the photoconductive drums 3 and 5 can be rotated in a direction indicated by respective arrows in FIG. 1.

The image forming components are disposed around the photoconductive drums 3 and 5 as described below. For example, the charging unit 8*a*, the developing unit 2*b*, the developing unit 2*a*, the intermediate transfer belt 9, and the drum cleaning unit 10*a* are arranged in a rotating direction of the photoconductive drum 3. Same as above, the charging unit 8*b*, the developing unit 4*b*, the developing unit 4*a*, the intermediate transfer belt 9, and the drum cleaning unit 10*b* are arranged in a rotating direction of the photoconductive drum 5.

The optical writing unit 15 emits laser light beams along the lines of respective optical writing paths L1 and L2 toward respective surfaces of the photoconductive drums 3 and 5, respectively, so that respective electrostatic latent images are formed on the respective surfaces thereof.

The intermediate transfer belt 9 serves as a transfer member. The intermediate transfer belt 9 forms an endless belt and is passed over or spanned around a plurality of supporting rollers. The intermediate transfer belt 9 includes a belt cleaning unit 9*a* and an image density sensor 9*b*. The belt cleaning unit 9*a* is used to remove residual developer or toner remaining on a surface of the intermediate transfer belt 9. The image density sensor 9*b* is used to detect the density of the image formed on the surface of the intermediate transfer belt 9.

The intermediate transfer belt 9 moves in a direction indicated by arrow A in FIG. 1. Inside the loop of the intermediate transfer belt 9, primary transfer rollers 11*a* and 11*b* are disposed. The primary transfer roller 11*a* is arranged at a portion facing the photoconductive drum 3 and sandwiching the intermediate transfer belt 9 so as to form a first primary transfer nip portion. Similarly, the primary transfer roller 11*b* is arranged at a portion facing the photoconductive drum 5 and sandwiching the intermediate transfer belt 9 to form a second primary transfer nip portion.

General operations of the above-described image forming apparatus 1 are described below.

When the image forming apparatus 1 receives image data, the photoconductive drums 3 and 5 rotate in a clockwise direction as shown in FIG. 1, the charging units 8*a* and 8*b* uniformly charge the respective surfaces of the photoconductive drums with the corresponding charging rollers (not shown).

The optical writing unit 15 emits the light laser beams corresponding to the respective image data, and irradiates the photoconductive drums 3 and 5. Electrostatic latent images corresponding to the respective image data are formed on the respective surfaces of the photoconductive drums 3 and 5.

The electrostatic latent images formed on the respective photoconductive drums 3 and 5 are developed by the respective developing units 2*a*, 2*b*, 4*a*, and 4*b*, which contain respective color developers or toners therein into a visible color toner images, for example, yellow, cyan, magenta, and black toner images, respectively. Those color toner images are sequentially overlaid one after another onto the surface of the intermediate transfer belt 9 such that a composite color toner image is formed on the surface of the intermediate transfer belt 9. Detailed image forming processes are described later.

When the image forming operation is started, a recording sheet S serving as a recording medium is conveyed along a sheet conveying path SP from a sheet feeding unit (not shown) toward a pair of registration rollers 12. The pair of registration rollers 12 stops and feeds the recording sheet S in synchronization with a movement of the composite color toner image towards a secondary transfer nip portion formed between the intermediate transfer belt 9 and a secondary transfer roller 13 so that the composite color toner image can be transferred onto the recording sheet S.

The recording sheet S that has the composite color toner image thereon is further conveyed and passes through a fixing unit 14. The fixing unit 14 fixes the composite color toner image to the recording sheet S by applying heat and pressure by a heat roller (not shown) and a fixing roller (not shown).

After passing through the fixing unit 14, the recording sheet S is discharged to a sheet discharging tray 1*d* formed on the main body 1*a* of the image forming apparatus 1.

After the composite color toner image is transferred onto the recording sheet S, the belt cleaning unit 9*a* removes residual developer on the surface of the intermediate transfer belt 9 before a next image forming operation is ready to start.

The image forming apparatus 1 performs the following image forming processes with two recording sheets by using the first and second image forming units 6 and 7 and the intermediate transfer belt 9.

When the image forming operation starts, the intermediate transfer belt 9 is rotated.

A first toner image of a first color formed on the first image forming unit 6 is transferred at the first primary transfer nip portion on the surface of the intermediate transfer belt 9, and is conveyed toward the second image forming unit 7. When the first toner image of the first color reaches the second image forming unit 7, a first toner image of a second color formed on the second image forming unit 7 is transferred at the second primary transfer nip portion on the surface of the intermediate transfer belt 9 so as to be overlaid on the first toner image of the first color. At the same time, a second toner image of a first color formed on the first image forming unit 6 is transferred at the first primary transfer nip portion onto on the surface of the intermediate transfer belt 9, and is conveyed toward the second image forming unit 7.

When the first image forming unit 6 transfers a first toner image of a third color to overlay on the first toner images of the first and second colors, the second image forming unit 7 transfers a second toner image of a second color to overlay on the second toner image of the first color.

When the first image forming unit 6 transfers a second toner image of a third color to overlay on the second toner image of the first and second colors, the second image forming unit 7 transfers a first toner image of a fourth color to overlay on the first toner image of the first, second, and third colors.

When the first toner image that is a full color toner image is conveyed to a secondary transfer nip portion, the second image forming unit 7 transfers a second toner image of a fourth color to overlay on the second toner image of the first, second, and third colors.

Then, the second toner image that is a full color toner image is conveyed to the secondary transfer nip portion.

As previously described, the optical writing unit 15 emits the laser light beams to the photoconductive drums 3 and 5 respectively included in the first and second image forming units 6 and 7 so that respective electrostatic latent images can be formed. In the image forming apparatus 1, the optical writing unit 15 disposed at a position beneath the image forming units 6 and 7. To allow the respective laser light beams to reach the photoconductive drums 3 and 5, the optical writing paths L1 and L2 in FIG. 1 run from the optical writing units 15 through openings including openings 63, 73*a*, 73*b*, and 74 of the first and second image forming units 6 and 7 to the respective photoconductive drums 3 and 5. Details of the openings will be described later.

Figure 2:
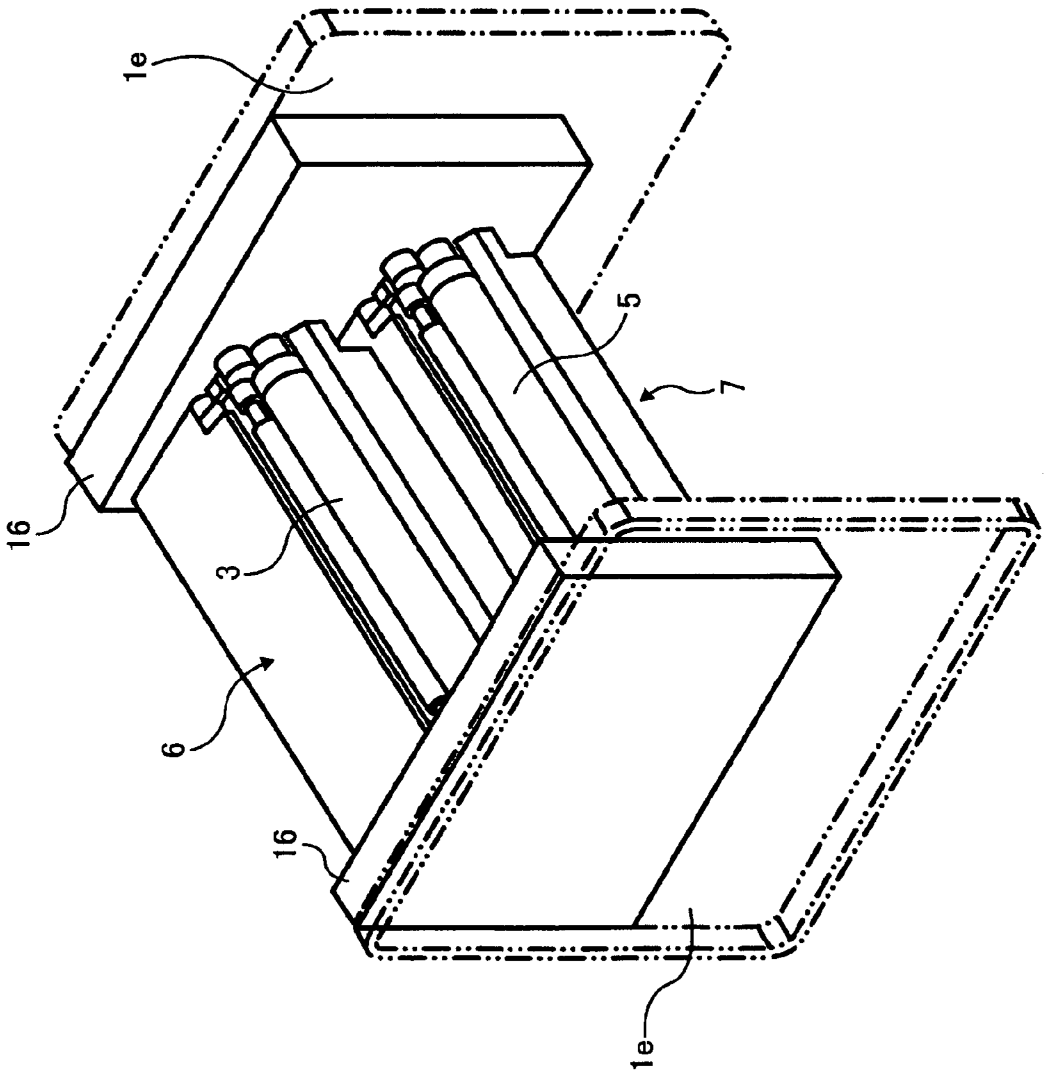
FIG. 2 is a perspective view of a main portion of the image forming apparatus of FIG. 1 according to an example embodiment of the present invention.
Figure 3:
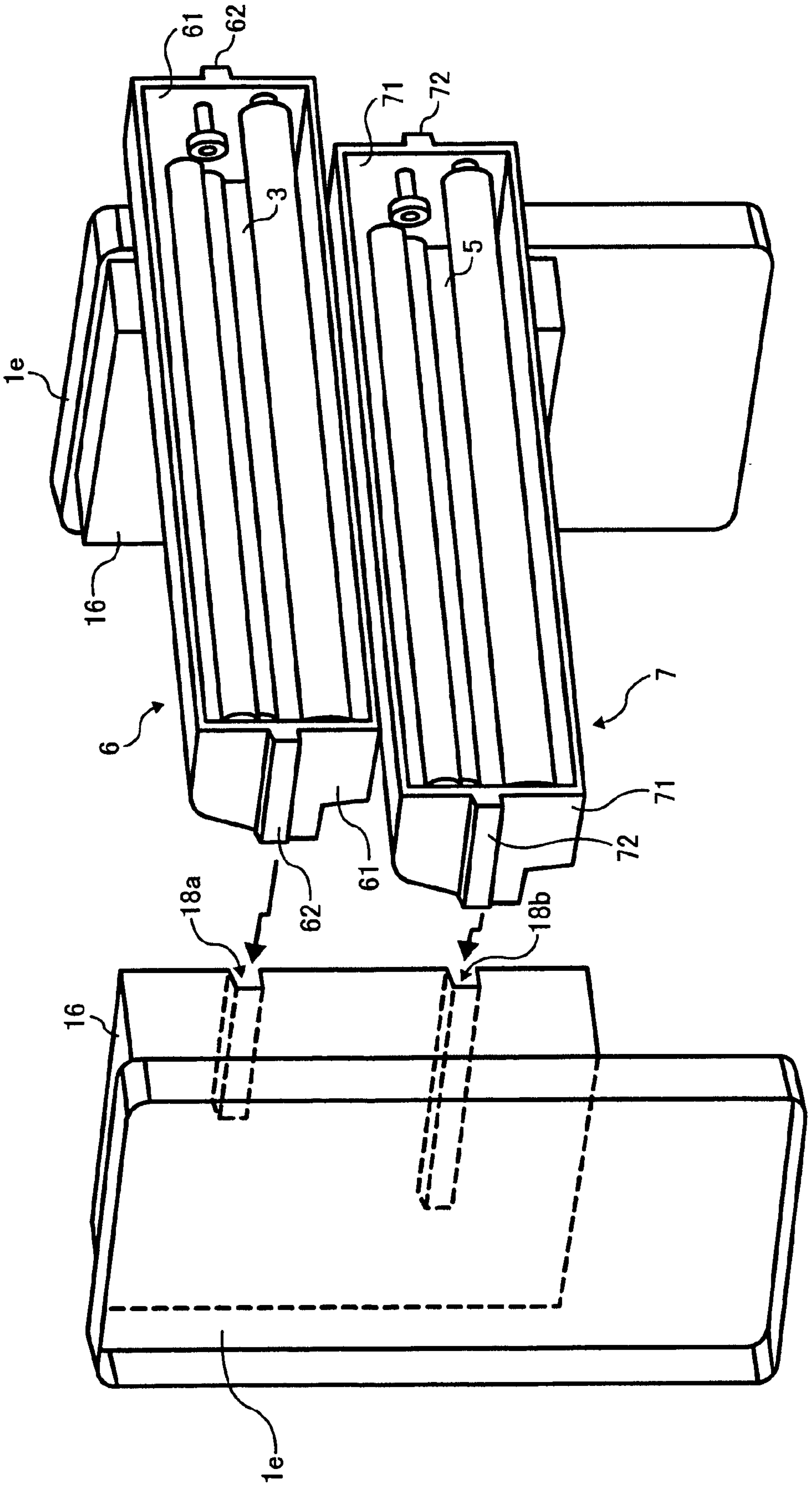
FIG. 3 is a perspective view of a supporting portion of an image forming unit of the image forming apparatus of FIG. 1 according to an example embodiment of the present invention.
Figure 4:
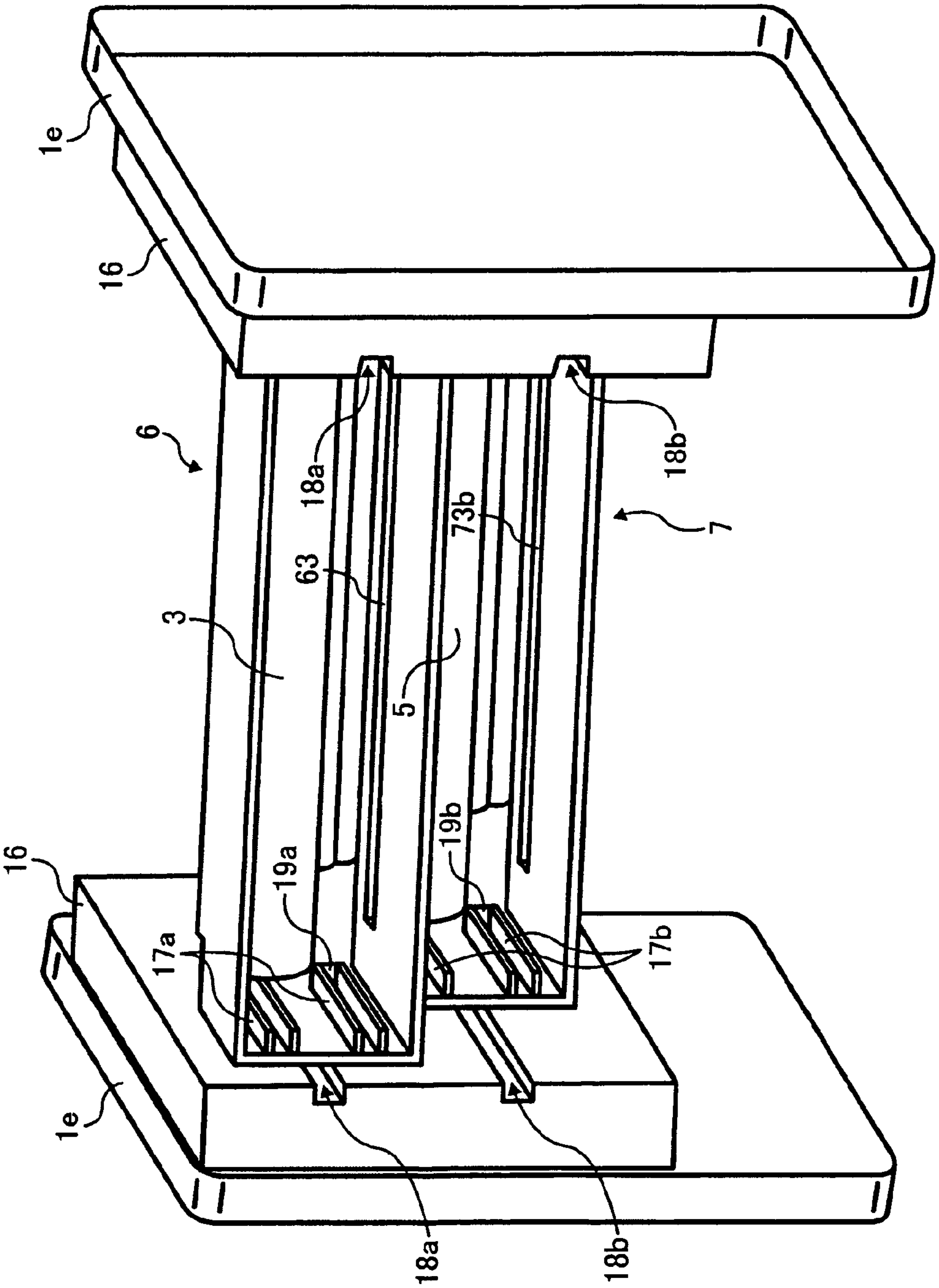
FIG. 4 is a perspective view of the image forming unit of FIG. 3 with the image forming units attached thereto.

Referring to FIGS. 2 through 4, more detailed (in some respects, simplified in other respects) structures (according to an example embodiment of the present application) of the main body 1*a* of the image forming apparatus 1 are described.

FIG. 2 is a perspective view of the main body 1*a* of the image forming apparatus 1 with the image forming units 6 and 7 mounted therein.

The main body 1*a* of the image forming apparatus 1 further includes housing side plates 1*e* and guide members 16. The guide members 16 are mounted on the respective housing side plates 1*e*. Both ends of the first and second image forming units 6 and 7 are slidably engaged with the respective guide members 16 between the housing side plates 1*e* in a reference direction parallel to a horizontal plane of the image forming apparatus 1 in a manner facing the surface of the intermediate transfer belt 9.

FIG. 3 is another perspective view of the main body 1*a* of the image forming apparatus 1, describing how to engage the image forming units 6 and 7 with the guide members 16.

In FIG. 3, the first image forming unit 6 includes the unit side plates 61 and rail-like guides 62, the second image forming unit 7 includes the unit side plates 71 and rail-like guides 72. As previously described, the respective unit side plates 61 hold both ends of the rotating shaft of the photoconductive drum 3, and the respective unit side plates 71 hold both ends of the rotating shaft of the photoconductive drum 5. The respective rail-like guides 62 and 72 are formed in a protruding or convex shape and are used to be slidably engaged with the main body 1*a* of the image forming apparatus 1.

The guide members 16 mounted on the respective housing side plates 1*e* include channel-like guides 18*a* and 18*b*. The channel-like guides 18*a* and 18*b* are formed to be engaged with the rail-like guides 62 and 72. More specifically, the channel-like guides 18*a* on the respective guide members 16 receive and thus are slidably engaged with the respective rail-like guides 62, and the channel-like guides 18*b* on the respective guide members 16 receive and thus are slidably engaged with the respective rail-like guides 72.

As indicated by arrows shown in FIG. 3, the image forming units 6 and 7 are inserted along the channel-like guides 18*a* and 18*b*, respectively, in the reference direction (again, parallel to a horizontal plane of the image forming apparatus 1) in a manner facing the surface of the intermediate transfer belt 9.

Further, the channel-like guides 18*a* and 18*b* have respective two ends in their longitudinal direction, i.e., the direction extending towards the surface of the intermediate transfer belt 9. A front end in a longitudinal direction of each of the channel-like guides 18*a* and 18*b* is open and has a concave shape in cross section, as is shown on a front end surface of the respective guide members 16 in a form of a concave shaped opening defining a recess. That is, two openings are formed on the front end surface of each of the guide members 16, as shown in FIG. 3. A back end or the other end in the longitudinal direction of each of the channel-like guides 18*a* and 18*b* can be blind, i.e., there can be a respective portion of the guide member 16 that forms a boundary of the respective channel-like guides 18*a* and 18*b* against which the respective rail-like guide 62 and 72 can abut, thus restraining motion of the respective image forming unit 6 and 7 in the reference direction away from the surface of the intermediate transfer belt 9. As such, the photoconductive drums 3 and 5 of the respective image forming units 6 and 7 can be positioned to be held in contact with the surface of the intermediate transfer belt 9.

In FIG. 3, the photoconductive drums 3 and 5 and developing sleeves are shown without their cases to explain a positional relationship thereof.

The cross sectional form of the channel-like guides 18*a* and 18*b* is not limited to the concave or hollow-ground shape. As an alternative, the channel-like guides 18*a* and 18*b* can be formed in a dovetail shaped guide. When the dovetail shaped guides are formed on the one end surface of the guide member 16, position shift caused between the guide members 16 can be reduced or prevented. More specifically, position shift in a main scanning direction of the photoconductive drums 3 and 5 can be reduced or prevented.

When the rail-like guides 62 and 72 are formed on the image forming units 6 and 7, respectively, and the channel-like guides 18*a* and 18*b* having the concave or hollow-ground shape are formed on the respective guide members 16, the inside of the image forming units 6 and 7 can have a flat surface without having an unnecessarily protruding portion. That is, an unnecessarily protruding portion can be reduced or eliminated, each part or member in the image forming units 6 and 7 can have sufficient room for being disposed or positioned.

FIG. 4 is another perspective view of the main body 1*a* of the image forming apparatus 1. FIG. 4 shows an inside of the image forming units 6 and 7 of the main body 1*a* before the developing units 2*a*, 2*b*, 4*a*, and 4*b* are mounted on the main body 1*a* of the image forming apparatus 1.

In FIG. 4, the photoconductive drums 3 and 5 are supported at the respective rotating shafts by engaging with the housing side plates 61 and 71 of the image forming units 6 and 7, respectively.

Further in FIG. 4, the image forming unit 6 includes sliding guides 17*a* and the image forming unit 7 includes sliding guides 17*b*. The sliding guides 17*a* and 17*b* are mounted on inner surfaces of the housing side plates 61 and 71, respectively, and serve as a sliding guide members to guide the developing units 2*a*, 2*b*, 4*a*, and 4*c* to be properly positioned with respect to the photoconductive drums 3 and 5. The sliding guides 17*a* and 17*b* run in a direction parallel to a horizontal plane of the image forming apparatus 1 in a manner facing the surface of the intermediate transfer belt 9.

The respective back end of the sliding guides 17*a* and 17*b* reaches a portion in the vicinity of the photoconductive drums 3 and 5.

The sliding guides 17*a* and 17*b* are channel members of C-shape in cross section. Each of the sliding guides 17*a* and 17*b* runs in a direction parallel to a horizontal plane of the image forming apparatus 1, as previously described, and has both ends in its longitudinal direction. A back end thereof is located at a portion spaced from a corresponding one of the photoconductive drums 3 and 5 by a specified distance. More specifically, the sliding guides 17*a* and 17*b* extend to the respective portions in which developing sleeves 23*a*, 23*b*, 43*a*, and 43*b* (see FIG. 6) provided in the developing units 2*a*, 2*b*, 4*a*, and 4*b*, respectively, can be mounted with a given distance with respect to the photoconductive drums 3 and 5 so that the developing sleeves 23*a*, 23*b*, 43*a*, and 43*b* cannot be held in contact with, or can be spaced by a given distance from a corresponding one of the photoconductive drums 3 and 5. Even though the photoconductive drums 3 and 5 and the developing units 2*a*, 2*b*, 4*a*, and 4*b* are disposed having a given space therebetween, the given space is designed to be sufficient for supplying the respective developers or toners from the developing units 2*a*, 2*b*, 4*a*, and 4*b* to the corresponding photoconductive drums 3 and 5. In this example embodiment of the present invention, the respective back ends of the sliding guides 17*a* and 17*b* are blocked by end plates 19*a* and 19*b*, respectively, and thereby, the developing units 2*a*, 2*b*, 4*a*, and 4*b* can be properly positioned without going further towards the photoconductive drums 3 and 5, which will be described later.

As shown in FIG. 1, the intermediate transfer belt 9 in this example embodiment of the present invention is inclined or tilted by a given degree of angle to prevent an unnecessary increase of space in a horizontal direction, and the image forming units 6 and 7 are arranged according to the inclination or tilt of the intermediate transfer belt 9. Therefore, the stroke of slide of the image forming unit 6, which is disposed at an upper portion of the image forming apparatus 1 in FIG. 1, is shorter than the stroke of slide of the image forming unit 7, which is disposed at a lower portion of the image forming apparatus 1 in FIG. 1. Therefore, the length of the sliding guides 17*a* corresponding to the image forming unit 6 is shorter than the length of the sliding guides 17*b* corresponding to the image forming unit 7.

Figure 5:
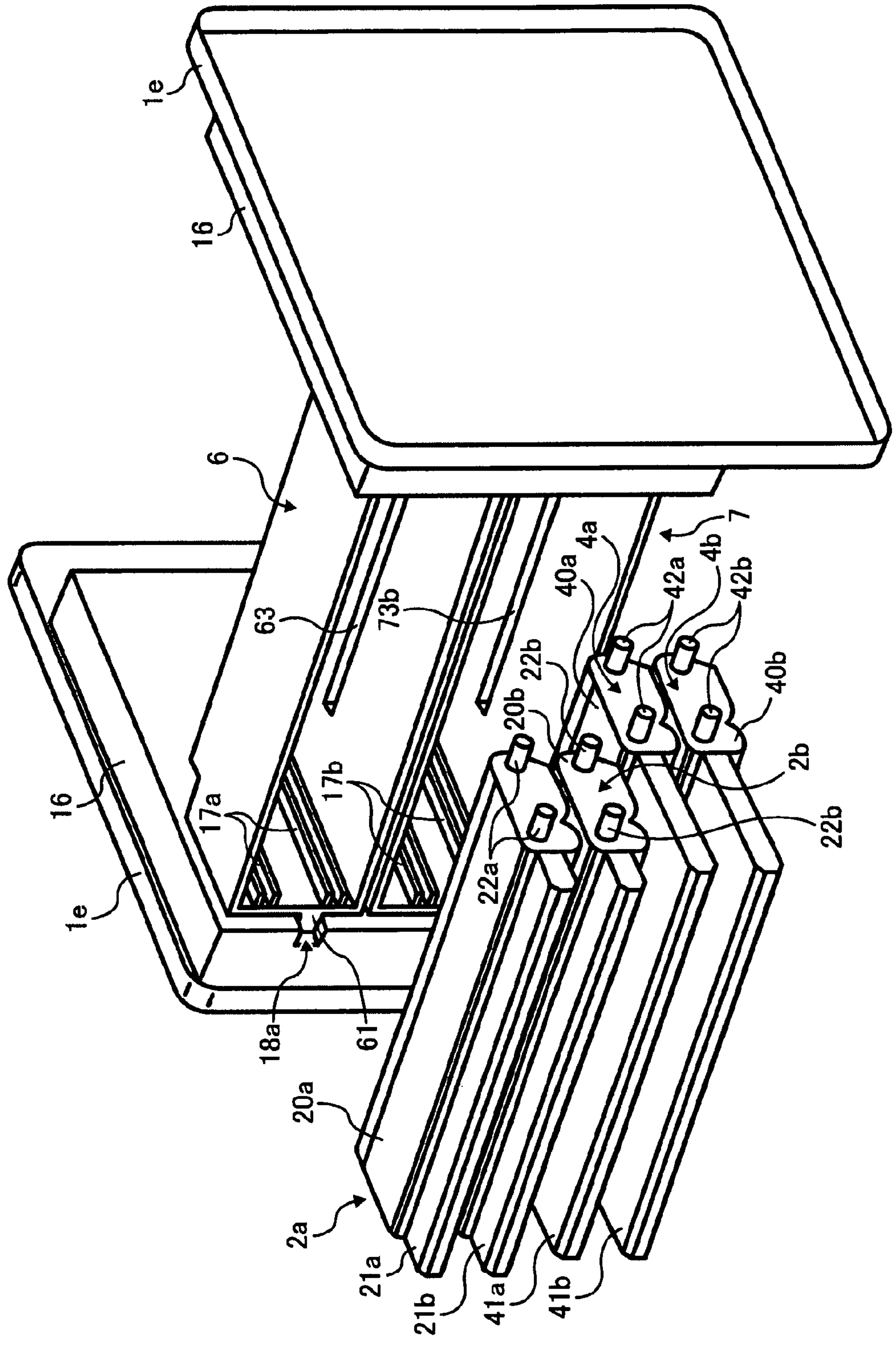
FIG. 5 is a perspective view of a developing unit with respect to the image forming unit of FIG. 4.
Figure 6:
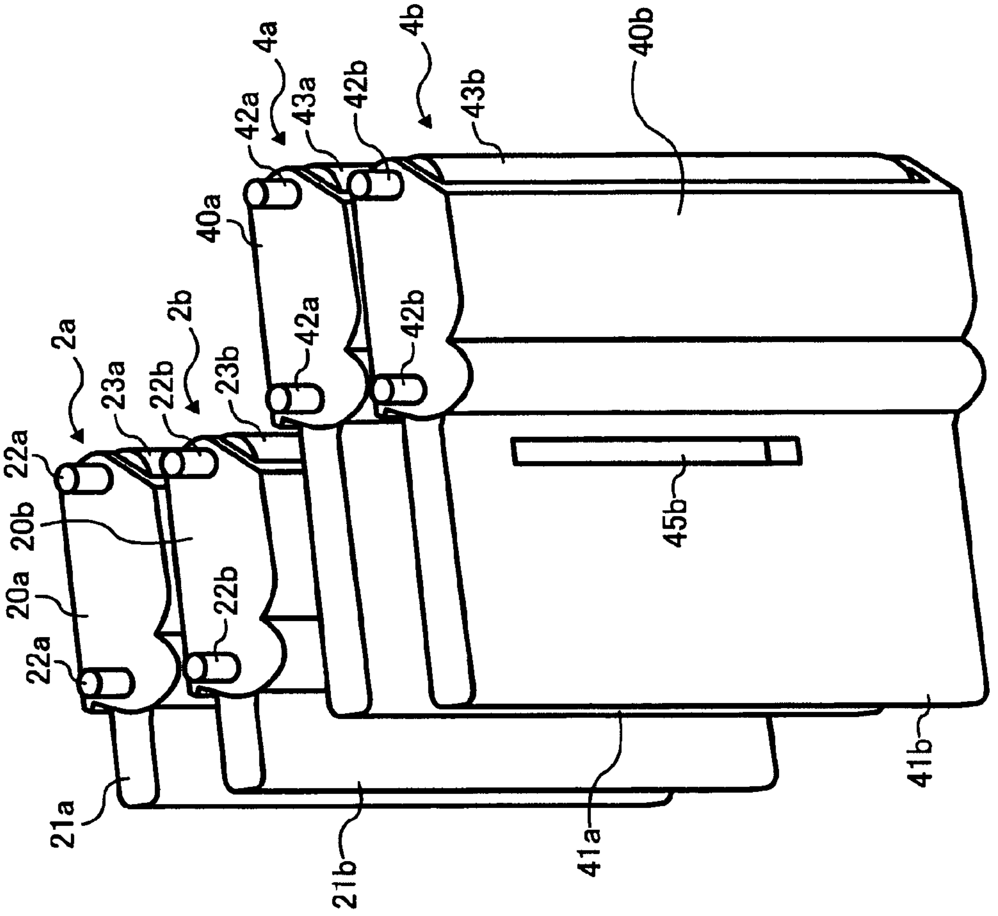
FIG. 6 is a perspective view of respective developer containers and respective handles for the developing units of FIG. 5.

Referring to FIGS. 5 and 6, schematic structures of the developing units 2*a*, 2*b*, 4*a*, and 4*b* are described. FIG. 5 is a perspective view showing a positional relationship between the developing units 2*a*, 2*b*, 4*a*, and 4*b* and the main body 1*a* of the image forming apparatus 1, and FIG. 6 is a perspective view showing a detailed structure of the developing units 2*a*, 2*b*, 4*a*, and 4*b*.

As previously described and as shown in FIGS. 1, 5, and 6, the developing units 2*a*, 2*b*, 4*a*, and 4*b* include the developer containers 20*a*, 20*b*, 40*a*, and 40*b*, respectively, and the handles 21*a*, 21*b*, 41*a*, and 41*b*, respectively.

The developer containers 20*a*, 20*b*, 40*a*, and 40*b* respectively include the developing sleeves 23*a*, 23*b*, 43*a*, and 43*b* (see FIG. 6), respectively, agitating members 24*a*, 24*b*, 44*a*, and 44*b* (see FIG. 1) respectively, that agitate respective developers, and respective developer layer regulating doctors (not shown) including a well-known developer collecting screw auger.

The handles 21*a*, 21*b*, 41*a*, and 41*b* are connected with the developer containers 20*a*, 20*b*, 40*a*, and 40*b*, respectively, and are arranged at a downstream side of a direction (indicated by arrow F in FIG. 1) to which the developing units 2*a*, 2*b*, 4*a*, and 4*b* are slidably mounted in the image forming apparatus 1. An operator holds the handles 21*a*, 21*b*, 41*a*, and 41*b* to smoothly push back or pull out the developing units 2*a*, 2*b*, 4*a*, and 4*b* for replacement.

As shown in FIGS. 5 and 6, the developer containers 20*a*, 20*b*, 40*a*, and 40*b* include pairs of sliding pins 22*a*, 22*b*, 42*a*, and 42*b*, respectively, on both side surfaces in their longitudinal direction. The respective pairs of sliding pins 22*a*, 22*b*, 42*a*, and 42*b* are mounted on the side surfaces of the developer containers 20*a*, 20*b*, 40*a*, and 40*b* so that the developing units 2*a*, 2*b*, 4*a*, and 4*b* can slidably be engaged with the sliding guides 17*a* and 17*b*. More specifically, the pair of sliding pins 22*a* mounted on the side surfaces of the developer containers 20*a* are slidably engaged with the upper ones of the sliding guides 17*a* of the image forming unit 6, the pair of sliding pins 22*b* mounted on the side surfaces of the developer containers 20*b* are slidably engaged with the lower ones of the sliding guides 17*a* of the image forming unit 6, the pair of sliding pins 42*a* mounted on the side surfaces of the developer containers 40*a* are slidably engaged with the upper ones of the sliding guides 17*b* of the image forming unit 7, and the pair of sliding pins 42*b* mounted on the side surfaces of the developer containers 40*b* are slidably engaged with the lower ones of the sliding guides 17*b* of the image forming unit 7.

To engage and position the developing units 2*a*, 2*b*, 4*a*, and 4*b* in the image forming units 6 and 7, the sliding pins 22*a*, 22*b*, 42*a*, and 42*b* are slidably inserted into the corresponding sliding guides 17*a* and 17*b*. The developing units 2*a*, 2*b*, 4*a*, and 4*b* are then pushed back toward the photoconductive drums 3 and 5 in a direction parallel to a horizontal plane of the image forming apparatus 1 in a manner facing the surface of the intermediate transfer belt 9. When the sliding pins 22*a*, 22*b*, 42*a*, and 42*b* come in contact with the end plates 19*a* and 19*b* of the sliding guides 17*a* and 17*b*, respectively, the developing sleeves 23*a*, 23*b*, 43*a*, and 43*b* are positioned with respect to the photoconductive drums 3 and 5.

The positioning of the developing units 2*a*, 2*b*, 4*a*, and 4*b* with respect to the photoconductive drums 3 and 5 are securely completed when a cover 1*b* mounted on the main body 1*a* of the image forming apparatus 1 is closed.

Referring back to FIG. 1, the image forming apparatus 1 further includes the cover 1*b* that opens and closes in a direction indicated by arrow B. The cover 1*b* is configured to securely support the developing units 2*a*, 2*b*, 4*a*, and 4*b* for positioning with respect to the photoconductive drums 3 and 5 so as to deter (if not prevent) the developing units 2*a*, 2*b*, 4*a*, and 4*b* from moving and thereby contacting with the photoconductive drums 3 and 5. To securely support the developing units 2*a*, 2*b*, 4*a*, and 4*b*, elastic members 50*a* and 50*b* such as a spring are provided on the inner surface of the cover 1*b* so that the elastic members 50*a* and 50*b* can securely hold respective front ends of the handles 21*a*, 21*b*, 41*a*, and 41*b*.

The elastic members 50*a* and 50*b* are provided in storing portions 1*ca* and 1*cb*, respectively. The storing portions 1*ca* and 1*cb* are portions on the inner surface of the cover 1*b* to receive and hold caps 51*a* and 51*b*, respectively. Each of the elastic members 50*a* and 50*b* has one end in a longitudinal direction that is slidably held in contact with the caps 51*a* and 51*b*. The cap 51*a* is held in contact with the respective front ends of the handles 21*a* and 21*b*, and the cap 51*b* is held in contact with the respective front ends of the handles 41*a* and 41*b*.

With the above-described structure, when the cover 1*b* is moved to its closed position, the caps 51*a* and 51*b* are pressed contact with the respective front ends of the handles 21*a*, 21*b*, 41*a*, and 41*b*. When the caps 51*a* and 51*b* are pressed, resilient restoration forces are exerted by the elastic members 50*a* and 50*b*. Thereby, the developing units 2*a*, 2*b*, 4*a*, and 4*b* are biased with respect to the photoconductive drums 3 and 5, the developing sleeves 23*a*, 23*b*, 43*a*, and 43*b* of the developing units 20*a*, 20*b*, 40*a*, and 40*b*, respectively, are firmly supported and surely maintained in an appropriate positioning that is in a non-contact manner with respect to the photoconductive drums 3 and 5.

Meanwhile, since the optical writing unit 15 that emits the laser light beams with respect to the photoconductive drums 3 and 5 for image forming is disposed beneath the second image forming unit 7 of the image forming apparatus 1 as shown in FIG. 1, the laser light beams may not successfully pass through to the photoconductive drums 3 and 5.

More specifically, while the optical writing paths L1 and L2 are to allow the respective laser light beams to pass therethrough, the optical writing path L1 running to the image forming unit 6 disposed in a vertically upward direction of the optical writing unit 15 can be blocked by the image forming unit 7 that is disposed between the image forming unit 6 and the optical writing unit 15.

To allow the laser light beam of the optical writing path L1 to successfully travel to the photoconductive drum 3, the openings 63, 73*a*, and 73*b* are formed on corresponding top and bottom plates of the image forming units 6 and 7 as shown in FIGS. 1, 4, 5, and 7. With the openings 63, 73*a*, and 73*b*, the laser light beam travel along the optical writing path L1 can smoothly reach the photoconductive drum 3.

The image forming units 6 and 7 include the respective top and bottom plates of the respective housings. As shown in FIG. 1, the opening 63 is formed on the bottom plate of the image forming unit 6, the opening 73*a* is formed on the top plate of the image forming unit 7, and the opening 73*b* is formed on the bottom plate of the image forming unit 7. In other words, the openings 63, 73*a*, and 73*b* run through in a direction perpendicular to a direction to which the image forming units 6 and 7 are attached to the image forming apparatus 1. The detailed shape and structure of the openings 63 and 73*b* are shown in FIGS. 4 and 5, while the opening 73*a* is not shown because of the angular view of the drawings.

Further, there are other openings to pass the laser light beam to the photoconductive drum 3. As shown in FIG. 6, an opening 45*b* is formed on the handle 41*b* of the developing unit 4*b* of the image forming unit 7. Another opening is formed on the handle 41*a* of the developing unit 4*a* of the image forming unit 7, but this opening on the handle 41*a* is not shown in the drawings because the opening is actually hidden behind the handle 41*b*. The opening formed on the handle 41*a* and the opening 45*b* formed on the handle 41*b* run through in a direction perpendicular to which the image forming units 6 and 7 are attached to the image forming apparatus 1 so that the laser light beam traveling in the optical writing path L1 to the photoconductive drum 3 can pass therethrough.

Figure 7:
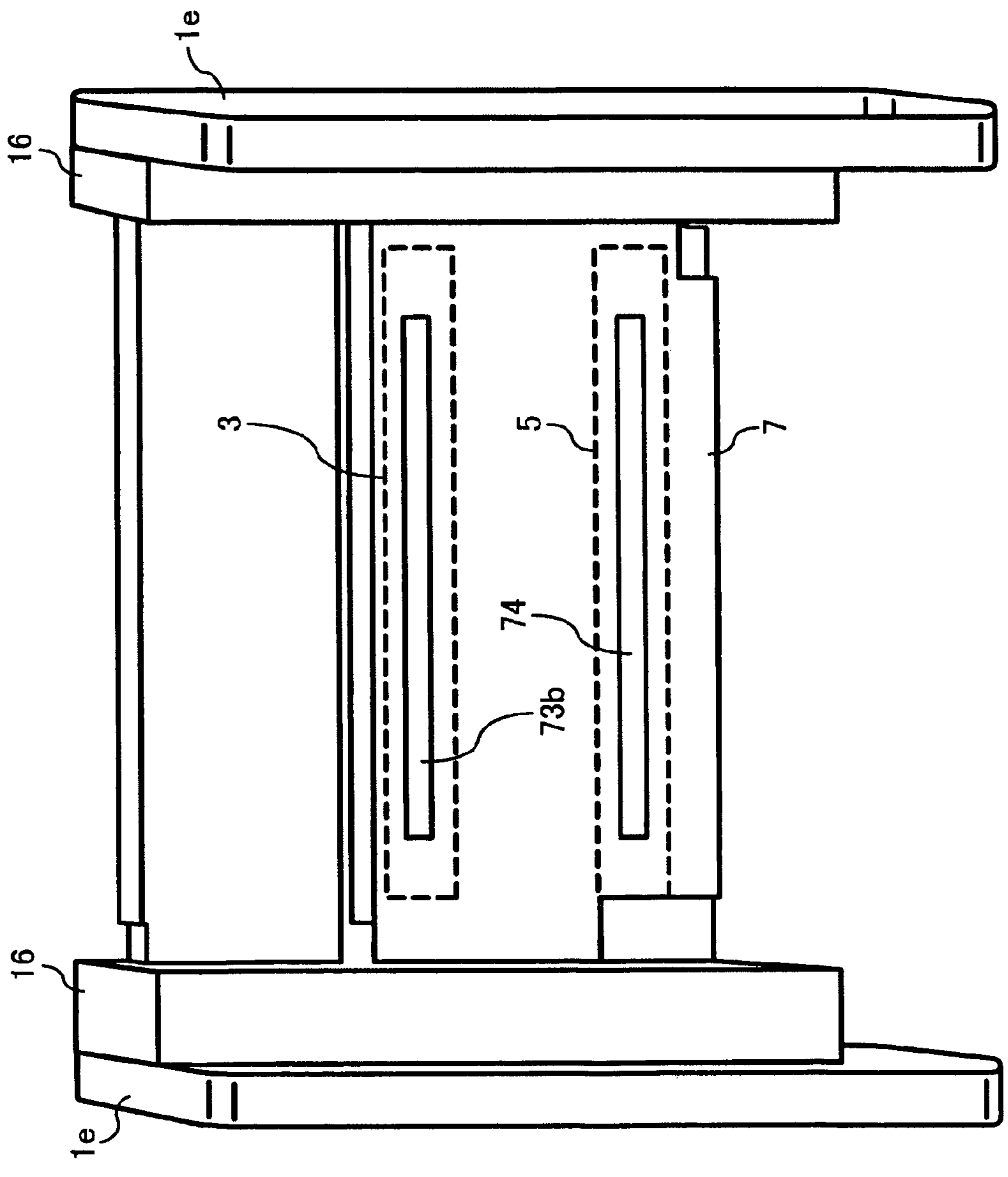
FIG. 7 is a perspective view of the image forming unit viewed from the bottom side of the image forming unit.

Further, in addition to the openings 73*a* and 73*b* for the laser light beam traveling in the optical writing path L1 to the photoconductive drum 3, another opening 74 is formed on the bottom plate of the image forming unit 7 for the laser light beam along the optical path L2 to the photoconductive drum 5, as shown in FIGS. 1 and 7. In FIG. 7, the photoconductive drum 3 in the image forming unit 6 and the photoconductive drum 5 in the image forming unit 7 are shown so as to explain a positional relationship of the openings 73*b* and 74 to pass the laser light beams along the optical writing paths L1 and L2.

With the above-described structures and operations of the image forming apparatus 1 according to the example embodiment of the present invention, the photoconductive drum 3 of the image forming unit 6, the photoconductive drum 5 of the image forming unit 7, the developing units 2*a* and 2*b* corresponding to the photoconductive drum 3, and the developing units 4*a* and 4*b* corresponding to the photoconductive drum 5 are positioned with respect to the intermediate transfer belt 9.

Following describes a method of positioning the respective image forming components in the image forming apparatus 1 focusing on the image forming unit 6. However, the following method can also be applied when positioning components related to the image forming unit 7.

(1) When the cover 1*b* of the main body 1*a* of the image forming apparatus 1 is in its open position, an operator inserts the image forming unit 6, in which the photoconductive drum 3 is previously mounted, into the main body 1*a* of the image forming apparatus 1. More specifically, an operator slidably engages the rail-like guides 62 mounted on the unit side plates 61 of the image forming unit 6 with the corresponding channel-like guides 18*a* of the guide members 16. The operator pushes back the image forming unit 6 in a direction parallel to a horizontal plane of the image forming apparatus 1 toward a position in which the photoconductive drum 3 can be held in contact with the intermediate transfer belt 9. The distance to which the image forming unit 6 is pushed is regulated by a length in an extending direction of the channel-like guides 18*a*. Thus, the image forming unit 6 is positioned with respect to the image forming apparatus 1.

(2) The operator then slidably inserts the developer containers 20*a* and 20*b* into the image forming unit 6. The developer containers 20*a* and 20*b* have the sliding pins 22*a* and 22*b* mounted on the respective side surfaces thereof, respectively. By engaging the sliding pins 22*a* and 22*b* of the developer containers 20*a* and 20*b* with the sliding guides 17*a* of the image forming unit 6, the developer containers 20*a* and 20*b* are pushed back to the photoconductive drum 3. At this time, the operator holds the handles 21*a* and 21*b* so that the developer containers 20*a* and 20*b* can smoothly be pushed to the far side of the image forming unit 6. When the respective sliding pins that are located closer to the photoconductive drums 3 among the sliding pins 22*a* and 22*b* hit the end plates 19*a* and 19*b*, respectively, the developer containers 20*a* and 20*b* are appropriately spaced from the photoconductive drum 3 so that the developing sleeves 23*a* and 23*b* of the developer containers 20*a* and 20*b*, respectively, are maintained in a non-contact manner with respect to the photoconductive drum 3.

(3) When the developer containers 20*a* and 20*b* are mounted to the image forming unit 6, the operator moves the cover 1*b* of the main body 1*a* of the image forming apparatus 1 to its closed position. In synchronization with the movement of the cover 1*b*, the cap 51*a* provided in the storing portion 1*ca* on the inner surface of the cover 1*b* contacts the respective front ends of the handles 21*a* and 21*b* of the developing units 20*a* and 20*b*, respectively. At this time, the resilient restoration force is exerted by the elastic member 50*a*. As a result, the developer containers 20*a* and 20*b* of the developing units 2*a* and 2*b*, respectively, are firmly supported and positioned with respect to the photoconductive drum 3. With the above-described operation, the photoconductive drum 3 and the developing sleeves 23*a* and 23*b* can surely be maintained in the non-contact condition, and more specifically, the photoconductive drum 3 is spaced by a specified distance from the developing sleeves 23*a* and 23*b* of the developer containers 20*a* and 20*b*, respectively.

Thus, by moving the photoconductive drum 3 and the developing units 2*a* and 2*b* in an identical direction that is a direction parallel to a horizontal plane of the image forming apparatus 1, the photoconductive drum 3 and the developer containers 20*a* and 20*b* of the developing units 2*a* and 2*b*, respectively, can be properly positioned with respect to the intermediate transfer belt 9, which can contribute to an easy positioning operation. Further, when the cover 1*b* is moved to the closed position, the bias of the elastic member 50*a* can be exerted to surely support the developing units 2*a* and 2*b* to maintain the positions of the photoconductive drum 3 and the developing sleeves 23*a* and 23*b* with respect to the intermediate transfer belt 9 to the respective regulated conditions. With the above-described structure, positioning errors can be reduced and non-uniformity on an image due to developing and/or transferring operations may be reduced or prevented.

When the image forming units 6 and 7 are detached from the intermediate transfer belt 9 of the image forming apparatus 1, an operator can take a detaching procedure opposite to the above-described attaching procedure.

Since the photoconductive drums 3 and 5 and the developing units 2*a*, 2*b*, 4*a*, and 4*b* are respectively moved in a direction parallel to a horizontal plane of the image forming apparatus 1 in a manner facing the surface of the intermediate transfer belt 9, even a relatively small space is sufficient for replacing the image forming units 6 and 7. Therefore, the necessary installation space for the intermediate transfer belt 9 can be reduced, which can reduce the size of the image forming apparatus 1. Further, the replacing procedure according to the example embodiment of the present invention is performed by replacing the image forming units 6 and 7 in a direction parallel to a horizontal plane of the image forming apparatus 1 in a manner facing the surface of the intermediate transfer belt 9, and not in a direction to which the surface of the intermediate transfer belt 9 is extended. Therefore, the image forming units 6 and 7 do not easily touch the surface of the intermediate transfer belt 9, which can reduce or prevent damages to the surface of the intermediate transfer belt 9 and/or the respective surfaces of photoconductive drums 3 and 5.

The above-described example embodiments of the present invention are illustrative, and numerous additional modifications and variations are possible in light of the above teachings. For example, elements and/or features of different example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed:

1. An image forming apparatus comprising:

a transfer member configured to receive an image; and at least one image forming unit configured to slidably move in a direction parallel to a horizontal plane of the image forming apparatus in a manner facing a surface of the transfer member and to be biased toward a desired position with respect to the transfer member when a cover of the image forming apparatus is moved to its closed position.

2. The image forming apparatus according to claim 1, wherein:

the at least one image forming unit comprises first and second image forming units, the first image forming unit comprising:

a first image bearing member configured to bear a first electrostatic latent image; and a first pair of developing units configured to supply respective developers of colors different from each other to form a first toner image based on the first electrostatic latent image on the first image bearing member, the first pair of developing units arranged around the first image bearing member; and the second image forming unit comprising:

a second image bearing member configured to bear a second electrostatic latent image; and a second pair of developing units configured to supply respective developers of colors different from each other and from the developers of the first pair of developing units to form a second toner image based on the second electrostatic latent image on the second image bearing member, the second pair of developing units arranged around the second image bearing member.

3. The image forming apparatus according to claim 2, wherein:

each of the first and second image forming units further comprises:

at least one sliding guide member configured to slidably guide a corresponding one of the first and second pairs of developing units to a position with respect to a corresponding one of the first and second image bearing members in the direction parallel to a horizontal plane of the image forming apparatus in a manner facing the surface of the transfer member.

4. The image forming apparatus according to claim 3, wherein:

each of the first and second image bearing members and a corresponding one of the first and second pairs of developing units are biased toward respective desired positions by closing the cover of the image forming apparatus.

5. The image forming apparatus according to claim 3, further comprising:

elastic members provided on an inner surface of the cover, each of which is configured to press a given one of the first and second pairs of developing units toward the transfer member so that the given one of the first and second pairs of developing units and a corresponding one of the first and second image bearing members are biased toward each other by a resilient restoration force exerted by the elastic member.

6. The image forming apparatus according to claim 3, wherein:

each of the developing units is configured to be spaced from a corresponding one of the first and second image bearing members by a specified distance sufficient for supplying the respective developers from the corresponding developing unit to the corresponding one of the first and second image bearing members.

7. The image forming apparatus according to claim 3, wherein:

each of the developing units comprises a handle arranged at a downstream side of a direction to which the corresponding developing unit is slidably mounted in the image forming apparatus, the handle including an opening configured to allow a laser light beam to pass therethrough to the first image bearing member.

8. The image forming apparatus according to claim 7, further comprising:

an optical writing unit configured to irradiate the corresponding one of the first and second image bearing members, the optical writing unit arranged at a position beneath the first and second image forming units.

* * * * *